United States Patent [19]

Hardt et al.

[11] Patent Number: 4,643,284
[45] Date of Patent: Feb. 17, 1987

[54] NON-DIFFERENTIAL DRIVE AXLE

[75] Inventors: John G. Hardt, Sylvania; Dennis W. Shea, Toledo, both of Ohio

[73] Assignee: Dana Corporation, Toledo, Ohio

[21] Appl. No.: 626,897

[22] Filed: Jul. 2, 1984

[51] Int. Cl.⁴ .................... F16D 21/08; F16H 35/04
[52] U.S. Cl. ................................... 192/50; 192/48.92; 74/650; 74/665 GB
[58] Field of Search ............... 192/48.92, 49, 50, 44, 192/45; 74/664, 665 F, 665 GB, 650; 180/233, 240, 245, 246, 54.1; 464/162

[56] References Cited

U.S. PATENT DOCUMENTS

| | | | |
|---|---|---|---|
| 1,106,605 | 8/1914 | Waterous | 192/50 |
| 1,155,467 | 10/1915 | Blood | 192/50 |
| 1,164,627 | 12/1915 | Bailey | 192/50 |
| 1,191,699 | 7/1916 | Hopper | 192/50 |
| 1,217,918 | 3/1917 | Connell | 74/650 |
| 2,131,015 | 9/1938 | Sanford et al. | 74/650 |
| 2,191,763 | 12/1939 | Casse | 74/650 |
| 2,241,606 | 5/1941 | Kysor | 74/607 |
| 3,700,082 | 10/1972 | Schwab | 192/50 |
| 4,460,183 | 7/1984 | Brissette | 464/162 X |
| 4,466,519 | 8/1984 | Romer | 192/13 R |

OTHER PUBLICATIONS

Dennis W. Shea, SAE, 11/9/81.

Primary Examiner—George H. Krizmanich
Attorney, Agent, or Firm—Robert H. Johnson; Robert M. Leonardi

[57] ABSTRACT

A non-differential drive axle which utilizes a pair of bi-directional overrunning clutches. The axle includes a housing within which a gear support is rotatably journalled. An intermediate shaft is connected to a gear support and is rotatably journalled at one end in the housing. The axle includes a pair of output shafts, one of which can be connected to the gear support for conjoint rotation by one of the overrunning clutches. The other output shaft can be connected to the intermediate shaft for conjoint rotation by the other overrunning clutch.

7 Claims, 4 Drawing Figures

NON-DIFFERENTIAL DRIVE AXLE

BACKGROUND OF THE INVENTION

This invention relates to drive mechanisms, and more specifically to non-differential drive axles for four-wheel drive systems in automotive vehicles.

BRIEF SUMMARY OF THE INVENTION

This invention relates to a non-differential drive axle. The drive axle includes an axle housing within which a gear support is rotatably journalled. An intermediate shaft is connected to said gear support and rotatably journalled in said housing. A first output shaft is rotatably journalled in said axle housing and said gear support. A second output shaft is rotatably journalled in said axle housing and said intermediate shaft. A first bi-directional overrunning clutch is provided for connecting said first output shaft and said gear support for conjoint rotation and a second bi-directional overrunning clutch is provided for connecting said second output shaft and said intermediate shaft for conjoint rotation. The first clutch includes a polygonal surface integral with said gear support and the second clutch includes a polygonal surface integral with said intermediate shaft.

It is a principal object of our invention to provide an improved non-differential drive axle which is low cost and readily manufactured.

The above and other objects, features and advantages of our invention will become apparent upon consideration of the detailed description and appended drawing.

DETAILED DESCRIPTION OF THE PREFERRED EMBODIMENT

Figure 1:
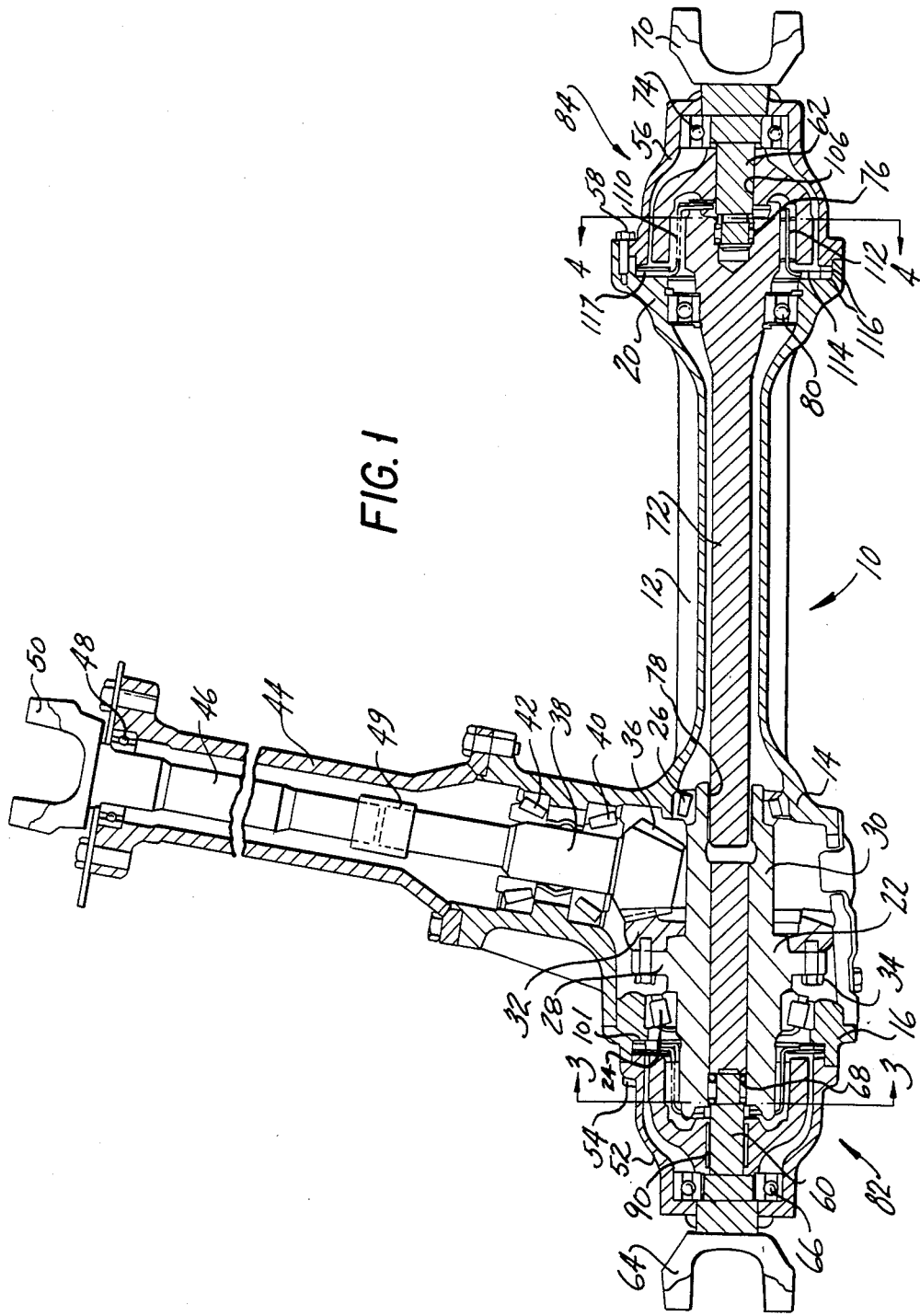
FIG. 1 is a sectional view of our improved drive axle.

Referring to FIG. 1, the reference numeral 10 denotes a non-differential drive axle which includes an axle housing 12. Axle housing 12 has an enlarged portion 14, a ring 16 connected to the open end of enlarged portion 14 by plurality of machine screws (not shown), and a flange 20.

Disposed in enlarged portion 14 is a gear support 22 which is rotatably journalled in axle housing 12 by a pair of tapered roller bearings 24 and 26. Gear support 22 includes a flange 28 and a shaft portion 30.

A ring gear 32 is carried by gear support 22 and is connected to flange 28 by a plurality of machine screws 34. Ring gear 32 meshes with a pinion gear 36 which is integral with an input shaft 38 rotatably journalled in axle housing 12 by a pair of tapered roller bearings 40 and 42.

Fixed to axle housing 12 and extending outwardly therefrom is a torque tube 44 within which a shaft 46 is disposed. Shaft 46 is rotatably journalled in torque tube 44 by a ball bearing 48 and is connected to shaft 38 by a slip joint 49. Integral with the outer end of shaft 46 is a yoke portion 50 of a universal joint through which drive axle 10 is connectable to a source of power.

Axle housing 12 also includes a sleeve 52 connected to the outer end of ring 16 by a plurality of machine screws 54 and a sleeve 56 connected to flange 20 by a plurality of machine screws 58.

Connected to gear support 22 by a splined connection 78 is an intermediate shaft 72 which is rotatably journalled at the end opposite from splined connection 78 in flange 20 by a ball bearing 80.

Axle 10 also includes a pair of output shafts 60 and 62. Shaft 60 has integral with it a yoke portion 64 of a universal joint and is rotatably journalled in sleeve 52 and one end of hollow shaft 30 by a ball bearing 66 and a needle bearing 68, respectively. Similarly, output shaft 62 has integral with it a yoke portion 70 of a universal joint and is rotatably journalled in sleeve 56 and one end of intermediate shaft 72 by a ball bearing 74 and a needle bearing 76, respectively.

Figure 2:
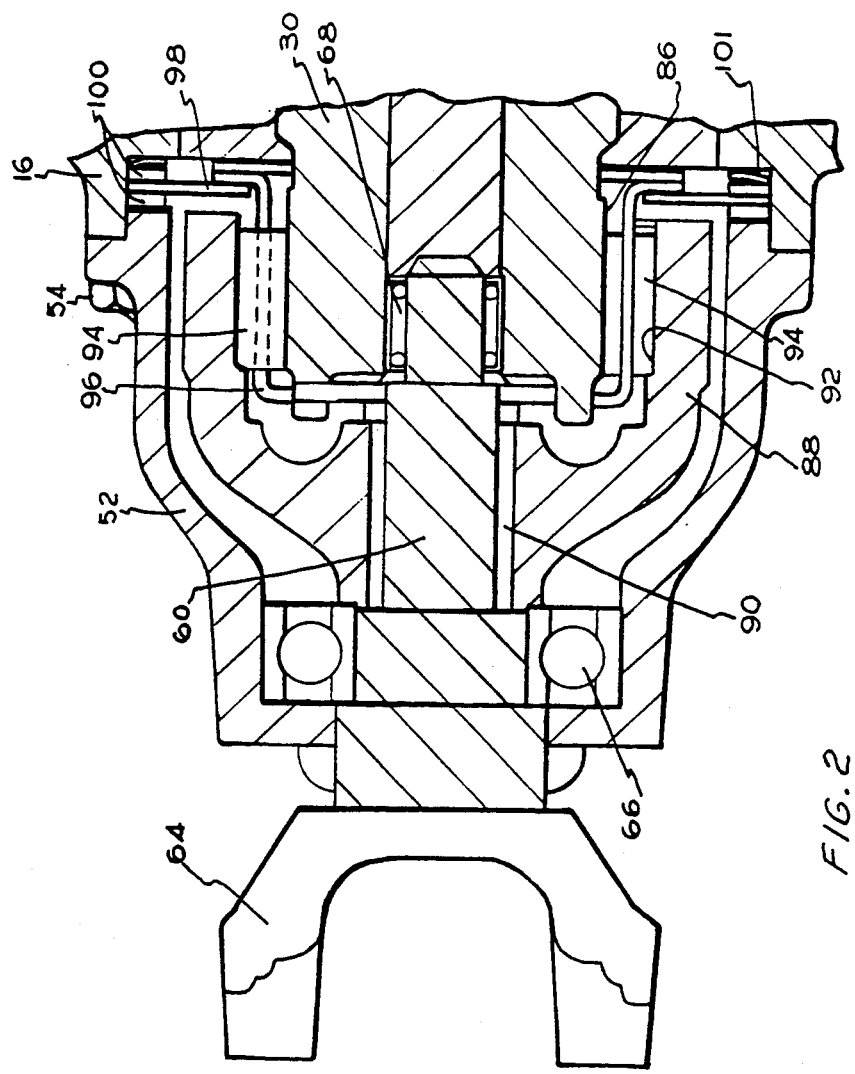
FIG. 2 is an enlarged, fragmentary longitudinal section of one overrunning clutch.
Figure 4:
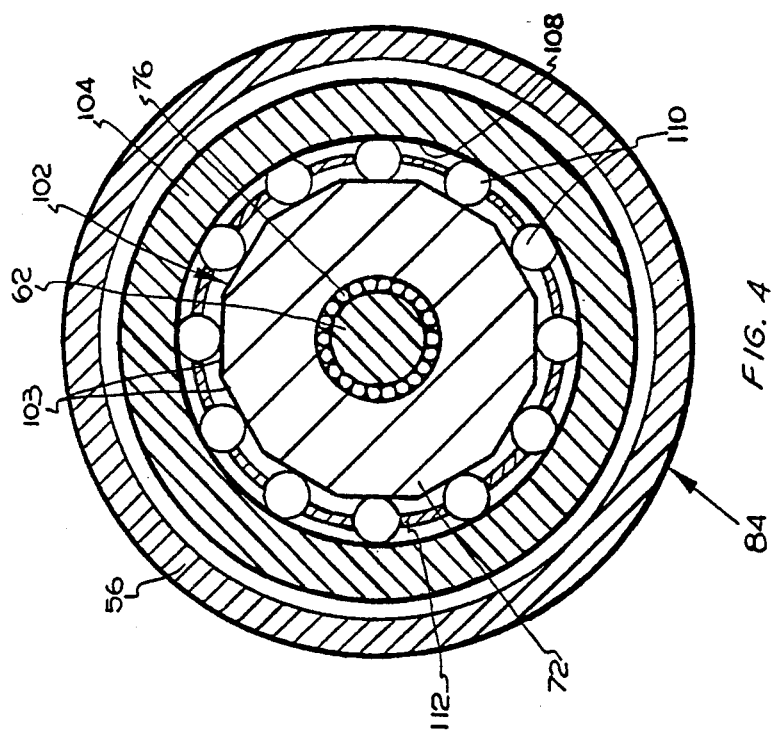
FIG. 4 is a cross-sectional view taken along line 4—4 in FIG. 1.
Figure 3:
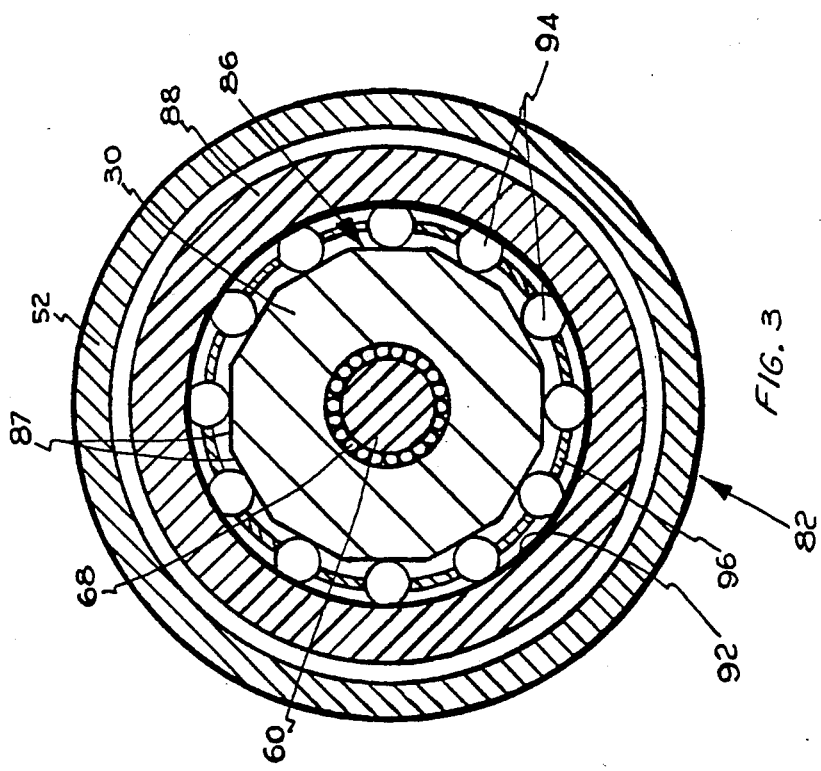
FIG. 3 is a cross-sectional view taken along line 3—3 in FIG. 1.

Referring now also to FIGS. 2, 3, and 4, a pair of bi-directional overrunning clutches 82 and 84 serve to drivingly connect output shafts 60 and 62 to gear support 22 and intermediate shaft 72, respectively, under certain conditions of operation of axle 10 as will be explained in more detail hereinafter. Overrunning clutch 82 includes a non-circular surface 86 integral with one end of shaft portion 30 of gear support 22. Preferably surface 86 has the shape of a regular polygon to provide a plurality of flats or sides 87, in this case 12 flats, although surfaces with other shapes could be used, for example, an undulating surface. Overlying surface 86 is a drum 88 which is connected to output shaft 60 by a splined connection 90. Drum 88 has a smooth circular inner surface 92. Disposed between surface 86 and surface 92 are twelve rollers 94. Separating each roller 94 is a retarding cage 96 which has a radially outwardly extending flange 98 partially disposed between two friction disks 100 which are biased into contact with flange 98 by a Belleville washer 101.

Overruning clutch 84 includes an inner non-circular surface 102 which is integral with intermediate shaft 72. Surface 102 preferably is a regular polygon, although surfaces with other shapes could be used, for example, an undulating surface. In this case surface 102 has twelve flats or sides 103. Overlying surface 102 is a drum 104 which is connected to output shaft 62 by a splined connection 106. Drum 104 includes a smooth circular inner surface 108. Disposed between surfaces 102 and 108 are twelve rollers 110. Surrounding and separating rollers 110 is a retarding cage 112 which includes a radially outwardly extending flange 114 which is partially disposed between a pair of friction disks 116 which are biased into contact with flange 114 by a Belleville washer 117.

We will now explain the operation of our improved non-differential drive axle 10. Axle 10 is intended for use in a four-wheel drive system as the rear axle and under normal road conditions does not function as a driving axle even when input shaft 38 is connected to a source of power. The four wheel drive system is designed so that under normal operating conditions the speed of rotation of output shafts 60 and 62 is approximately three to six percent greater than the speed of rotation of gear support 22 and intermediate shaft 72, but it is possible to use a greater percentage of speed differential. Under these conditions of operation both clutches 82 and 84 are overrunning. That is, no power is being transmitted through axle 10 to output shafts 60 and 62. In the situation where the difference in speed of rotation between output shafts 60 and 62 and gear support 22 and intermediate shaft 72 becomes less than three to six percent, such as a situation in which the wheels associated with the front drive axle lose traction, then power will be transmitted through overrunning clutches 82 and 84. When the differential between the speed of rotation of gear support 22 and output shaft 60 decreases to the point that it falls within the designed range for lockup of clutch 82, then rollers 94 tend to be forced outwardly against surface 92 of drum 88 by the action of flats 87 on non-circular surface 86 along with the action of retarding cage 96 which tends to urge rollers 94 in a direction to cause engagement of clutch 82. When clutch 82 in engaged, then output shaft 60 is coupled to gear support 22 for conjoint rotation so that power is delivered through shaft 60 to the associated wheel. Similarly, the engagement of clutch 84 is identical to clutch 82 and upon engagement power is transmitted through output shaft 62 to the associated wheel.

While we have disclosed only a single embodiment of our invention it will be understood that various changes and modifications can be made to our invention, so that the scope of our invention should be determined from the claims when construed in light of the prior art.

We claim:

1. A drive axle for a vehicle, said vehicle having a set of wheels spaced along a first axis of rotation of said wheels, said drive axle comprising:
    a housing adapted to extend generally along said first axis between said two wheels, said housing first and second axially spaced ends,
    a gear support rotatably journalled in said housing adjacent said first end of said housing,
    an intermediate shaft drivingly connected to said gear support and rotatably journalled in said housing adjacent said second end of said housing,
    a first output shaft rotatably journalled in said first end of said housing and said gear support,
    a second output shaft rotatably journalled in said second end of said housing and said intermediate shaft,
    a first bi-directional overrunning clutch positioned adjacent said first end of said housing and operable to connect said first output shaft with said gear support for conjoint rotation, said first overruning clutch including a first non-circular surface on said gear support, a first drum connected to said first output shaft and overlying said first non-circular surface, and a first plurality of rollers disposed between said first drum and said first non-circular surface actuatable to connect said first drum and said first non-circular surface for conjoint rotation, and
    a second bi-directional overrunning clutch positioned adjacent said second end of said housing and operable to connect said second output shaft with said intermediate shaft for conjoint rotation, said second overrunning clutch including a second non-circular surface on said intermediate shaft, a second drum connected to said second output shaft and overlying said second non-circular surface, and a second plurality of rollers disposed between said second drum and said second non-circular surface actuatable to connect said second drum and said second non-circular surface for conjoint rotation.

2. The axle as set forth in claim 1 and including:
    a first gear fixed to said gear support,
    an input shaft rotatably journalled in said housing,
    a second gear connected to said input shaft and in mesh with said first gear,
    and a torque tube fixed to said housing and adapted to be attached to a frame member of said vehicle, said input shaft extending through and being journalled in said torque tube, said torque tube and said input shaft extending from said housing along a second axis at an acute angle relative to said first axis.

3. The axle as set forth in claim 1 wherein said first non-circular surface is integral with said gear support and said second non-circular surface is integral with said intermediate shaft.

4. The axle as set forth in claim 2 wherein said input shaft includes a first shaft segment rotatably journalled in said housing, a second shaft segment rotatably journalled in said torque tube and coaxial with said first shaft segment on said second axis, and a slip joint rotationally joining the first and second input shaft segments and allowing limited axial movement therebetween.

5. The axle as set forth in claim 1 wherein said gear support includes first and second ends and a hollow shaft portion therebetween, said first end of said gear support being positioned adjacent said first end of said housing, wherein said intermediate shaft is drivingly connected to said second end of said gear support through a spline connection, and wherein said first output shaft is rotatably journalled in said first end of said gear support.

6. The axle as set forth in claim 5 wherein said first overrunning clutch includes a polygonal surface integral with said gear support adjacent said first end of said gear support and wherein said second overrunning clutch includes a polygonal surface integral with said intermediate shaft.

7. The axle as set forth in claim 6 wherein at least one of said first and second overrunning clutches includes a cage for positioning its respective plurality of rollers, said cage including a flange extending transverse to said first axis, and wherein said at least one overrunning clutch further includes a pair of friction discs positioned on either side of said flange for frictional engagement therewith and an annular spring for biasing said friction discs into engagement with said flange.

* * * * *